*(12)* United States Patent
Chiloyan et al.

(10) Patent No.: US 7,165,109 B2
(45) Date of Patent: Jan. 16, 2007

(54) METHOD AND SYSTEM TO ACCESS SOFTWARE PERTINENT TO AN ELECTRONIC PERIPHERAL DEVICE BASED ON AN ADDRESS STORED IN A PERIPHERAL DEVICE

(75) Inventors: John H. Chiloyan, Redmond, WA (US); Samuel A. Mann, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 658 days.

(21) Appl. No.: 09/760,327

(22) Filed: Jan. 12, 2001

(65) Prior Publication Data

US 2002/0095501 A1 Jul. 18, 2002

(51) Int. Cl.
*G06F 15/16* (2006.01)
*G06F 15/177* (2006.01)

(52) U.S. Cl. .................. 709/227; 709/217; 709/221
(58) Field of Classification Search ................ 709/227, 709/228, 229
See application file for complete search history.

(56) References Cited

U.S. PATENT DOCUMENTS

| | | | | |
|---|---|---|---|---|
| 4,558,413 | A | * | 12/1985 | Schmidt et al. ............. 707/203 |
| 5,301,287 | A | * | 4/1994 | Herrell et al. ............... 711/202 |
| 5,428,748 | A | * | 6/1995 | Davidson et al. .............. 710/9 |
| 5,664,195 | A | * | 9/1997 | Chatterji ..................... 717/178 |
| 5,802,304 | A | | 9/1998 | Stone ..................... 395/200.57 |
| 5,845,077 | A | * | 12/1998 | Fawcett ..................... 709/221 |
| 5,870,610 | A | * | 2/1999 | Beyda ........................ 717/173 |
| 5,905,736 | A | * | 5/1999 | Ronen et al. ............... 370/546 |

(Continued)

FOREIGN PATENT DOCUMENTS

EP 0304540 4/1994

(Continued)

OTHER PUBLICATIONS

Universal Serial Bus Specification Revision 2.0, Apr. 27, 2000, Published online at http://www.usb.org/developers/data/usb_20.zip, pp. 38, 243-274, 291, & 340.

(Continued)

*Primary Examiner*—Jason Cardone
*Assistant Examiner*—Thomas Duong
(74) *Attorney, Agent, or Firm*—Ronald M. Anderson

(57) ABSTRACT

A method and system for obtaining a network address stored in a peripheral device, and accessing a remote device at the network address to obtain information related to the peripheral device. When the peripheral device is connected to a host computer, the stored network address is read by the host computer. The network address is preferably determined by the host computer when a peripheral device, such as a USB device, is initially connected to the host device, or when the host device with a newly connected USB is energized. The network address is then used by the host device to communicate with a remote device so that information pertaining to the peripheral device, such as a device driver for the peripheral device, can be accessed by the host device at the remote device. In addition, the host device can download or automatically execute a program stored at the remote device, download and install an application program relating to use of the peripheral device, display a Web page that includes information pertinent to the peripheral device, download documentation for the peripheral device, access help information, download and install firmware into the peripheral device and/or access other material related to the peripheral device. Access of the remote device can be fully automated or can optionally be implemented only with the permission of the user.

35 Claims, 9 Drawing Sheets

U.S. PATENT DOCUMENTS

| | | | | |
|---|---|---|---|---|
| 6,009,480 | A * | 12/1999 | Pleso | 710/8 |
| 6,023,585 | A * | 2/2000 | Perlman et al. | 717/178 |
| 6,026,366 | A * | 2/2000 | Grube | 705/10 |
| 6,081,850 | A * | 6/2000 | Garney | 710/15 |
| 6,115,471 | A * | 9/2000 | Oki et al. | 380/242 |
| 6,122,676 | A * | 9/2000 | Brief et al. | 710/9 |
| 6,148,346 | A * | 11/2000 | Hanson | 719/321 |
| 6,167,567 | A * | 12/2000 | Chiles et al. | 717/173 |
| 6,205,501 | B1 * | 3/2001 | Brief et al. | 710/100 |
| 6,219,698 | B1 * | 4/2001 | Iannucci et al. | 709/221 |
| 6,249,825 | B1 * | 6/2001 | Sartore et al. | 710/8 |
| 6,327,584 | B1 * | 12/2001 | Xian et al. | 707/1 |
| 6,353,866 | B1 * | 3/2002 | Fensore et al. | 710/104 |
| 6,389,495 | B1 * | 5/2002 | Larky et al. | 710/8 |
| 6,421,069 | B1 * | 7/2002 | Ludtke et al. | 715/762 |
| 6,424,424 | B1 * | 7/2002 | Lomas et al. | 358/1.14 |
| 6,473,854 | B1 * | 10/2002 | Fleming, III | 713/1 |
| 6,529,946 | B1 * | 3/2003 | Yokono et al. | 709/217 |
| 6,609,115 | B1 * | 8/2003 | Mehring et al. | 705/51 |
| 6,728,787 | B1 * | 4/2004 | Leigh | 719/327 |
| 6,754,722 | B1 * | 6/2004 | Herzi | 710/8 |
| 6,813,670 | B1 * | 11/2004 | Yao et al. | 710/302 |
| 6,915,337 | B1 * | 7/2005 | Motoyama et al. | 709/220 |
| 6,917,923 | B1 * | 7/2005 | Dimenstein | 705/51 |
| 6,980,558 | B1 * | 12/2005 | Aramoto | 370/401 |
| 7,076,536 | B1 * | 7/2006 | Chiloyan et al. | 709/220 |
| 2001/0002914 | A1 * | 6/2001 | Aramoto | 370/535 |
| 2002/0067504 | A1 * | 6/2002 | Salgado et al. | 358/1.15 |
| 2003/0065773 | A1 * | 4/2003 | Aiba et al. | 709/224 |

FOREIGN PATENT DOCUMENTS

| | | |
|---|---|---|
| WO | WO9850861 | 11/1998 |
| WO | WO0033232 | 6/2000 |

OTHER PUBLICATIONS

Microsoft Plug and Play Specification—Plug and Play Design Specification for IEEE 1394, Version 1.0c, Mar. 3, 1999, Published online at http://www.microsoft.com/hwdev/download/respec/1394PNP_10c.zip, pp. 6-8.

* cited by examiner

METHOD AND SYSTEM TO ACCESS SOFTWARE PERTINENT TO AN ELECTRONIC PERIPHERAL DEVICE BASED ON AN ADDRESS STORED IN A PERIPHERAL DEVICE

FIELD OF THE INVENTION

The present invention generally relates to a method and system that stores network addresses in the firmware memory of electronic peripheral devices, and more specifically, to retrieving device drivers and other software specifically related to such electronic peripheral devices from remote sites identified by the network addresses.

BACKGROUND OF THE INVENTION

Many computers and associated peripheral devices are designed to work with a plug-and-play capability integrated into an operating system running on the computer. Plug-and-play enables the computer to automatically detect a newly connected peripheral device and install and register it as part of the computer system. Prior to the development of plug-and-play, it was necessary for a user to specifically indicate to the operating system that a new peripheral device had been added, to identify the peripheral device added, and to manually set any resources required by the peripheral device, such as interrupt request values (IRQs). Under plug-and-play, the computer operating system automatically detects the presence of the newly added peripheral device when the computer is booted up, identifies the device, and then automatically assigns the resources required by the device. More recently, operating systems have added the ability to "hot-detect" when a peripheral device is added or disconnected after a computer is already booted up and operational, identify the peripheral device, and install or uninstall the device as part of the computer system. For example, many new computers and peripherals support the Universal Serial Bus (USB) standards and have USB interfaces. Newer versions of Microsoft® Corporation's WINDOWS® operating systems running on these new computers are able to hot-detect a newly connected or disconnected USB peripheral device, such as a scanner, printer, digital camera, etc., while the computer is running. The operating system identifies the specific USB device that has just been connected to a USB port based upon information obtained from the device. Then, if the appropriate peripheral device driver and client application software were previously installed, the computer installs the device as part of the computer system. Specifically, the operating system checks to see if the particular peripheral device model is included in the current device registry, and if so, loads the corresponding device driver into memory. The newly connected USB peripheral device can then be used immediately.

However, when a new USB peripheral device is connected to a computer for the first time, the USB peripheral will not be listed in the device registry. For some peripheral devices, an information file (i.e., a *.INF file) and device driver are included with the operating system, which enables the operating system to add necessary information about the peripheral to the device registry and to load the device driver. However, in many cases, peripheral information and a device driver are not included with the operating system. In that event, it is currently necessary to run a setup program to obtain and install the required information, driver, and any related client application software for the peripheral device.

One example of the type of application software that might be installed is a printer manager program for use with a USB printer. Additionally, the application software may include programs that provide additional features or functions for the USB device, or that provide an added benefit to the purchaser of the peripheral device.

Typically, any required driver and user application software are provided on a CD-ROM or on one or more floppy disks packaged with a peripheral device. When drivers or user application software for USB peripheral devices are not provided with the operating system, the user must load CD-ROMs or floppy disks, or otherwise manually provide the required material. The interaction required by the user to initially install a peripheral device thus detracts from a quality user experience, since the initial installation of the peripheral device is not truly a "plug-and-play" operation.

When a new peripheral device is connected to a computer, an operating system, which includes plug-and-play capability, detects the presence of the new peripheral device. As mentioned above, such an operating system then checks to see if the peripheral has been previously installed. If the peripheral has not been previously installed, the operating system initiates a procedure to install a new peripheral. If the operating system does not include the necessary files, the operating system gives the user an option to insert a CD-ROM or other medium on which an appropriate information file (e.g., a *.INF file), driver software, and application software can be found.

Producing and distributing CD-ROMs and/or floppy disks with peripheral devices represents a considerable expense to peripheral vendors for at least two reasons. First, there is the cost of the media and packaging associated with providing such tangible components. In addition, scheduling production of CD-ROMs and/or floppy disks can delay shipment of newly developed peripheral devices, or reduce the amount of software development time available. If changes to the device driver or other software are required late in the development cycle, then CD-ROM production may be delayed until after hardware production of the peripheral is already complete. In addition to delaying delivery of the peripherals, storing the completed peripherals in inventory can add unnecessary cost. Alternatively, to ensure CD-ROM production meets peripheral hardware production and shipping schedules, software development may have to be cut short before corrections can be made or before program features can be added. Elimination of program features can reduce the competitiveness and attractiveness of a product in the marketplace. Vendors may also be forced to distribute updated software on another CD-ROM, or by other means, to correct bugs or to provide improved features and functionality in the software materials.

Updated device drivers and other materials are often available for downloading over the Internet. Since many computer users have either high speed, full-time connections or at least a dial-up connection to the Internet, a peripheral vendor doesn't necessarily need to supply a CD-ROM and/or floppy disks with a peripheral device to provide the required drivers and application software. Instead, a vendor can require users to manually download and install such software from a specified site over the Internet. However, connecting to the Internet and/or downloading drivers and other software materials is also a manual, time-consuming process that most users would prefer to avoid. In addition, such a manual process can present a problem for novice users, can delay the initial installation of a newly purchased peripheral device on a computer, and will clearly detract from user satisfaction with the peripheral device.

From the preceding discussion, it will be apparent that it would be preferable to enable the operating system on a computing device to automatically obtain any device driver required and any related software/document materials pertaining to a peripheral device that has just been connected to the computing device for the first time from a designated remote site via the Internet (or other network). Eliminating the need for the user to insert a CD-ROM or floppy disk into a host computing device, or otherwise manually obtain the required software, provides an improved plug-and-play capability. Eliminating the need for vendors to include CD-ROMs and/or floppy disks with peripheral devices to provide the drivers and other software should extend software development time and reduce production costs.

SUMMARY OF THE INVENTION

The present invention is directed to a method and system for obtaining a network address stored in a peripheral device, and accessing a remote device at the network address to obtain information related to the peripheral device. When the peripheral device is connected to a host computer, the stored network address is read by the host computer, enabling communication between the host device and a remote device accessed at the network address, so that information pertaining to the peripheral device can be downloaded by the host device from the remote device.

In addition to downloading information from the remote device at the network address, the host device can automatically execute a program stored at or downloaded from the remote device, install a device driver for the peripheral device, install an application program, display a Web page, register the peripheral device, download documentation for the peripheral device, download and install firmware into the peripheral device, access help information, and/or access other material related to the peripheral device. Those skilled in the art will recognize that a variety of different types of information related to the peripheral device can be downloaded, displayed, or obtained at the network address.

The network address is preferably stored in a read-only memory (ROM) of the peripheral device. However, in another embodiment, the network address is stored in a rewritable memory medium that is associated with and readable by the peripheral device.

Preferably, the method includes the step of enumerating the peripheral device when the peripheral device is operatively attached to the host device. During enumeration, the peripheral device identifies itself and transfers the network address in a communication to the host device. Communication is initiated when the operating system on the host device queries the peripheral device for a device descriptor assigned to the peripheral device. The device descriptor includes information such as a vendor identifier and a product identifier. The operating system also queries the peripheral device for a string descriptor. A peripheral device vendor includes a string descriptor in the memory of the peripheral that includes the network address at which a device driver, software, document, or other material related to the peripheral can be obtained. Alternatively, the string descriptor can hold a pointer to memory location at which the network address is stored in the peripheral device. The operating system parses the device descriptor for the vendor identifier, product identifier, and other identifiers. The operating system also parses the string descriptor to obtain the network address or pointer to it.

Alternatively, the step of transferring the network address from the peripheral device to the host may be performed after enumeration by utilizing other functions that request and receive the string descriptor from the peripheral device. For example, the step of transferring may be performed by issuing a class request to the peripheral device for the network address, wherein the class is preferably a class assigned for operating system functions. Alternatively, the transferring step may be performed by implementing a vendor-specific command or commands to obtain the network address from the peripheral device.

The method can further include a preliminary check by the operating system to determine whether the peripheral device was previously installed on the host device. If not, the operating system will look for a network address in the device descriptor, issue a string request, issue a vendor specific command, or otherwise obtain the network address. Alternatively, this check can be done after the host device has already obtained the network address. In this case, the decision determines whether to launch a task to access the network address, retrieve and install the device driver and/or other information, and/or perform any other task related to accessing the network address.

The step of enabling communication between the host device and remote device includes the step of automatically retrieving data, machine instructions, or a document pertaining to the peripheral device from the remote device at the network address. Preferably, the step of enabling communication includes the step of automatically executing a program stored on the remote device that pertains to the peripheral device. In addition, or alternatively, the step of enabling communication includes the step of automatically receiving an instruction to execute a program stored on the host device that pertains to the peripheral device. This step can further include the step of automatically installing the driver for the peripheral device on the host device, automatically executing an application program pertaining to the peripheral device, and/or providing a link to the network address to enable a user to select the information that is provided at the remote device.

The method preferably further includes the step of automatically executing a browser function on the host device and automatically navigating to the network address. Alternatively, the method includes the step of requesting whether a user wants to execute a browser function on the host device and if so, automatically navigating to the network address. The user is enabled to suppress further requests to execute a browser function on the host device for automatically navigating to the network address.

Another aspect of the present invention is directed to a system for automatically accessing information related to a peripheral device. The system includes a host device having a memory in which machine instructions are stored. A processor in the host device executes the machine instructions, causing the host device to access a network address stored in the peripheral device. The host device, which is connected to the peripheral device, also includes a network communication interface that enables communication with a remote device or additional source of machine-readable material. Preferably, the remote device is a server that communicates with the host device over a network. However, the remote device may be another peripheral device, such as an external storage device. Such remote devices may be useful for industrial, automotive, or other systems in which the peripheral device directly informs the host device where to find information, rather than simply providing identifiers that the host device must use to locate the information. In any case, the remote device stores data, machine instructions, documents, or other machine-readable material pertaining to the peripheral device.

Another aspect of the invention is directed to a machine-readable medium with machine-executable instructions that perform the steps of the method described above.

BRIEF DESCRIPTION OF THE DRAWING FIGURES

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

Exemplary Operating Environment

Figure 1:
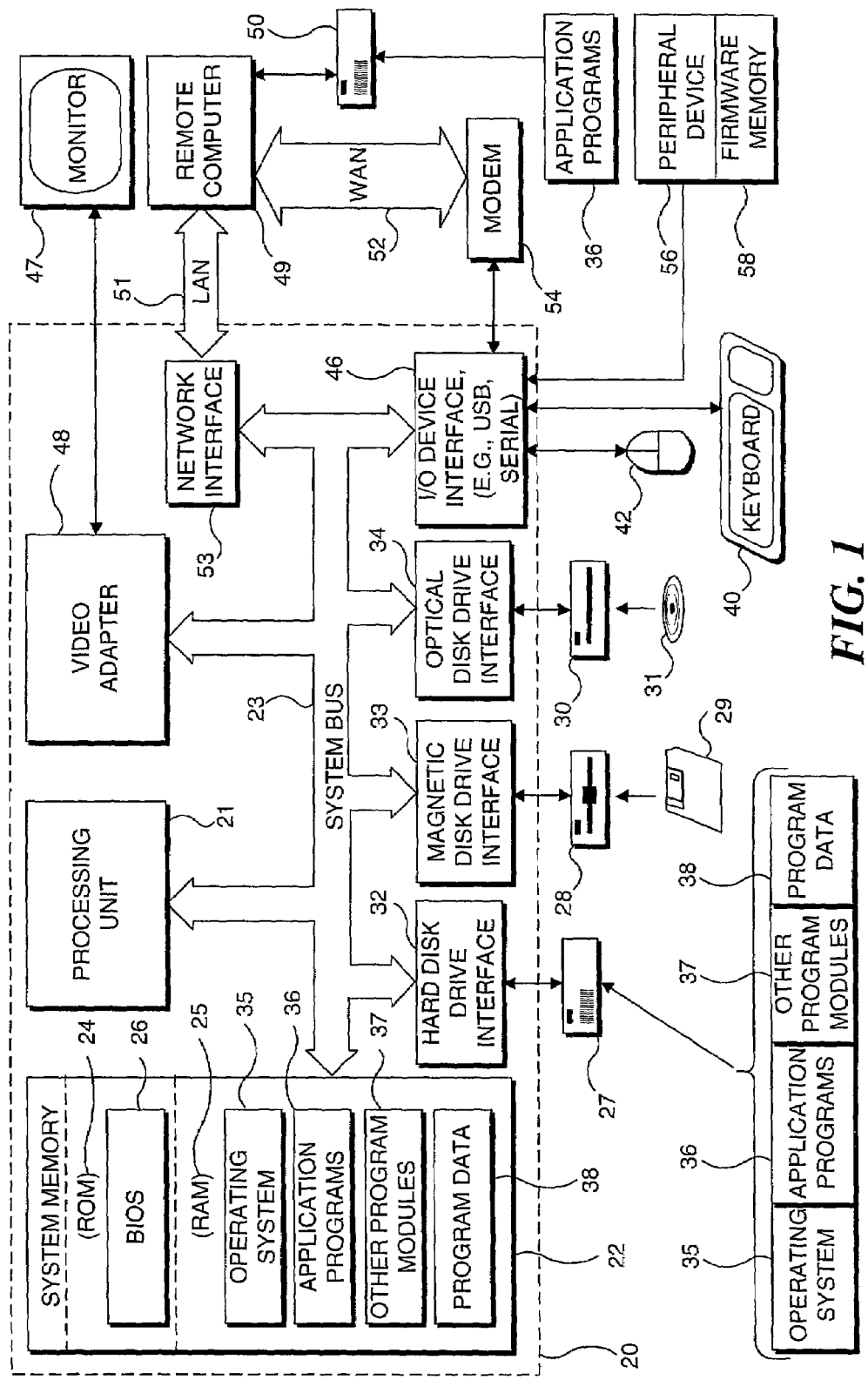
FIG. 1 is a schematic block diagram of an exemplary personal computer (PC) system suitable for implementing the present invention.

FIG. 1 and the following discussion are intended to provide a brief, general description of a suitable computing environment in which the present invention may be implemented, both in regard to a server that stores and provides Web pages and a client that requests the Web pages and displays them to a user. Although not required, the present invention will be described in the general context of computer executable instructions, such as program modules that are executed by a personal computer. Generally, program modules include routines, programs, objects, components, data structures, etc. that perform particular tasks or implement particular abstract data types. Moreover, those skilled in the art will appreciate that this invention may be practiced with other computer system configurations, particularly in regard to a client device for displaying a Web page, including hand held devices, pocket personal computing devices, digital cell phones adapted to connect to a network, and other microprocessor-based or programmable consumer electronic devices, game consoles, TV set-top boxes, multiprocessor systems, network personal computers, minicomputers, mainframe computers, industrial control equipment, automotive equipment, aerospace equipment, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the present invention includes a general purpose computing device in the form of a conventional personal computer 20, provided with a processing unit 21, a system memory 22, and a system bus 23. The system bus couples various system components including the system memory to processing unit 21 and may be any of several types of bus structures, including a memory bus or memory controller, a peripheral bus, and a local bus using any of a variety of bus architectures. The system memory includes read-only memory (ROM) 24 and random access memory (RAM) 25. A basic input/output (BIOS) system 26, containing the basic routines that help to transfer information between elements within the personal computer 20, such as during start up, is stored in ROM 24. The personal computer 20 further includes a hard disk drive 27 for reading from and writing to a hard disk (not shown), a magnetic disk drive 28 for reading from or writing to a removable magnetic disk 29, and an optical disk drive 30 for reading from or writing to a removable optical disk 31, such as a CD-ROM or other optical media. Hard disk drive 27, magnetic disk drive 28, and optical disk drive 30 are connected to system bus 23 by a hard disk drive interface 32, a magnetic disk drive interface 33, and an optical drive interface 34, respectively. The drives and their associated computer-readable media provide nonvolatile storage of computer-readable machine instructions, data structures, program modules, and other data for personal computer 20. Although the exemplary environment described herein employs a hard disk, a removable magnetic disk 29, and a removable optical disk 31, it will be appreciated by those skilled in the art that other types of computer-readable media, which can store data that is accessible by a computer, such as magnetic cassettes, flash memory cards, digital video disks, Bernoulli cartridges, random access memories (RAMs), read-only memories (ROMs), and the like, may also be used in the exemplary operating environment.

A number of program modules may be stored on the hard disk, magnetic disk 29, optical disk 31, ROM 24 or RAM 25, including an operating system 35 (with a browser function), one or more application programs 36 (such as a setup program), other program modules 37, and program data 38. A user may enter commands and information into personal computer 20 through input devices such as a keyboard 40 and a pointing device 42. Other input devices (not shown) may include a microphone, joystick, game pad, satellite dish, scanner, digital camera, or the like. These and other input devices are often connected to processing unit 21 through an input/output (I/O) device interface 46 that is coupled to the system bus. Output devices, such as a printer (not shown), may also be connected to processing unit 21 through an I/O device interface 46 that is coupled to the system bus. Similarly, a monitor 47 or other type of display device is also connected to system bus 23 via an appropriate interface, such as a video adapter 48, and is usable to display Web pages, and/or other information. In addition to the monitor, personal computers are often coupled to other peripheral output devices (not shown), such as speakers (through a sound card or other audio interface—not shown). Such input/output devices are generally referred to as peripheral devices. For purposes of discussion in regard to the present invention, general peripheral device 56 is coupled to personal computer 20 via I/O device interface 46. The term I/O device interface is intended to encompass each interface specifically used for a serial port, a parallel port, a game port, a keyboard port, and/or a USB port. Through I/O device interface 46, information is communicated between peripheral device 56 and processing unit 21 via system bus 23. Peripheral device 56 includes firmware memory 58 for storing information. Firmware memory 58 may be erasable programmable read-only memory (EPROM), flash memory, magnetic storage, or other memory. Firmware memory 58 stores a vendor ID, a product ID, serial number, firmware revision level, and/or other information related to the peripheral device 56. Firmware memory 58 also stores a URI or other type of address indicating a location from which a driver, data, and/or other material relevant to the peripheral device can be accessed and/or downloaded.

Personal computer 20 may operate in a networked environment using logical connections to one or more remote sources, such as a remote computer 49. In regard to the present invention, the URI or address stored in the memory of the peripheral device may specify a location that is accessed through remote computer 49. Remote computer 49 may be another personal computer, a server (which is typically generally configured much like personal computer 20), a router, a network personal computer, a peer device, a satellite, or other common network node, and typically includes many or all of the elements described above in connection with personal computer 20, although only an external memory storage device 50 has been illustrated in FIG. 1. The logical connections depicted in FIG. 1 include a local area network (LAN) 51 and a wide area network (WAN) 52. Such networking environments are common in offices, enterprise-wide computer networks, intranets, and the Internet.

When used in a LAN networking environment, personal computer 20 is connected to LAN 51 through a network interface or adapter 53. When used in a WAN networking environment, personal computer 20 typically includes a modem 54 or other means for establishing communications over WAN 52, such as the Internet. Modem 54, which may be internal or external, is connected to the system bus 23, or coupled to the bus via I/O device interface 46, i.e., through a serial port. In a networked environment, program modules depicted relative to personal computer 20, or portions thereof, may be stored in the remote memory storage device. It will be appreciated that the network connections shown are exemplary and other means of establishing a communications link between the computers may be used, such as wireless communication and wide band network links.

Exemplary Implementation of the Present Invention

The following describes exemplary implementations of preferred embodiments using I/O device interface 46 for communication between a personal computer 20, acting as a host device, and a peripheral device 56, such as a printer, modem, digital camera, keyboard, and/or almost any other type of device that is adapted to couple in communication with a computing device. The present invention is particularly useful in connection with peripheral devices that are designed to be plug-and-play, and more particularly, for those peripheral devices that are designed to be hot-connected to a computer, such as any peripheral device that meets the USB specification. Those skilled in the art will recognize that the details provided below may be modified slightly to apply to non-plug-and-play technologies and other forms of communication with peripheral devices, such as RS-232C serial, IEEE 1284 parallel, IrDA infrared, and other standards. Accordingly, it will be understood that the present invention is applicable to almost any type of peripheral device that communicates with a host device using almost any type of communication protocol. However, peripheral devices that are designed to connect to a computing device through a USB port are used consistently in the following examples to simplify the discussion and disclosure of this invention.

Figure 2:
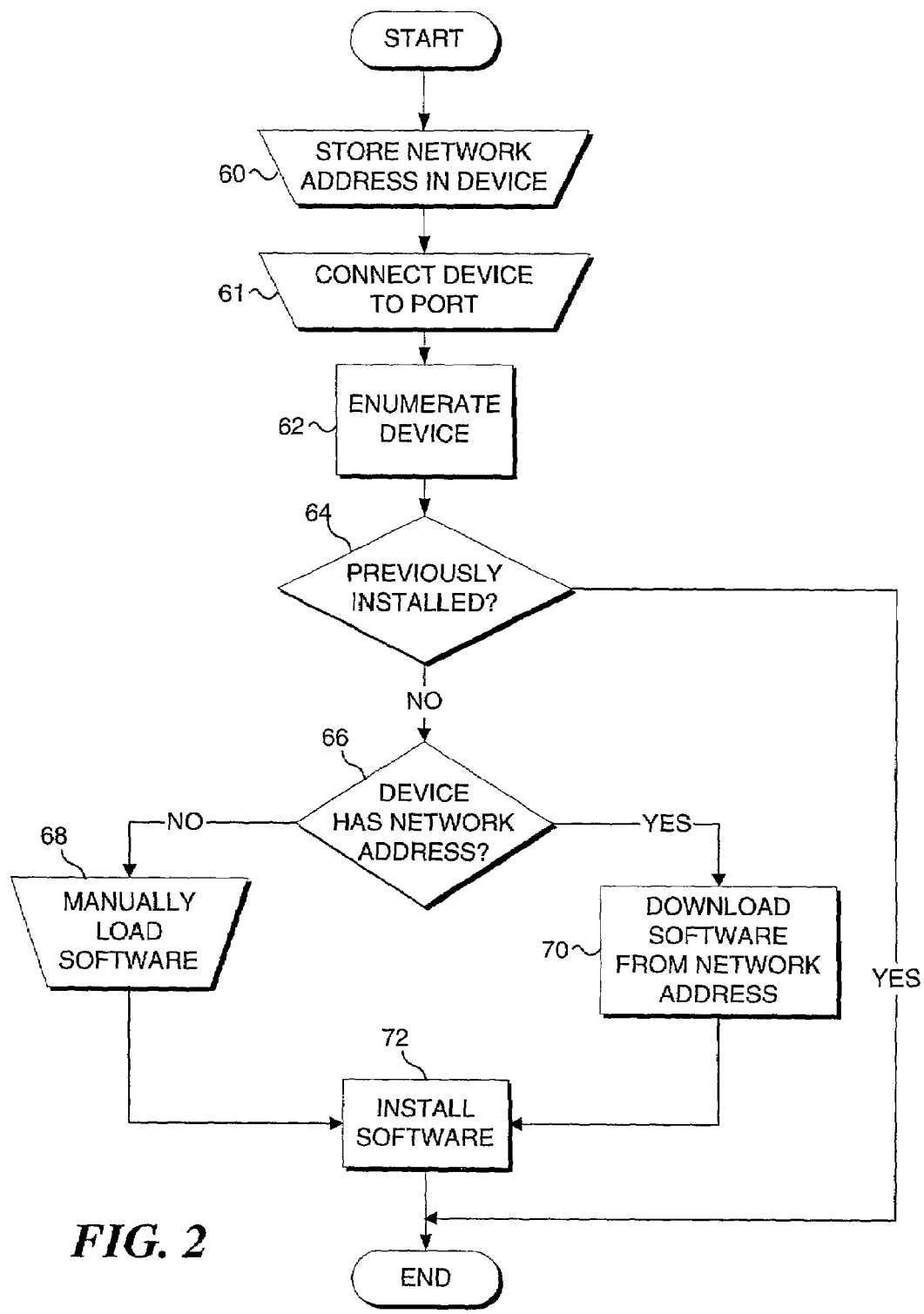
FIG. 2 is a flow diagram illustrating the logic implemented in a preferred embodiment of the present invention.

FIG. 2 illustrates the overall logic employed in an embodiment that installs a device driver for a peripheral device, and/or accesses application software or other material related to the peripheral device. The ability to automatically access a remote site to download and install a device driver for a peripheral device the first time that the peripheral device is connected to a computing device is an important application of the present invention. At a step 60, a network address is stored in the peripheral device. Preferably, the network address will be stored in a ROM of the peripheral device when the device is being manufactured, or at least, before the peripheral device is sold to an end user.

Another embodiment of the present invention pertains to existing peripheral devices whose identifier and/or other information can be updated or modified in flash memory, electrically erasable programmable read-only memory (EEPROM), or some other form of rewritable, non-volatile memory, possibly including removable and/or rewritable storage media such as a floppy disk, a cartridge, a memory stick, or a memory card. In such devices, updated or alternate information can be directly provided. Examples of peripheral devices with removable or rewritable storage medium include some printers, game consoles, and industrial machines. Although it is desirable to eliminate the need for any removable storage medium holding device drivers and/or other materials related to a peripheral, at times it can be economically beneficial to upgrade an existing peripheral, instead of replacing the existing peripheral with a new peripheral that contains a network address. Thus, in some cases it is possible to add a network address to an existing peripheral via a removable or rewritable storage medium. This approach enables some existing peripheral devices to be updated to include a network address among the other identifiers already in the peripheral device. This one-time update to the existing peripheral device enables such existing peripheral devices to provide its host device with a network address where the host can access future device driver revisions and other information, rather than continue to rely on additional CD-ROMs or other removable medium for future device driver revisions and/or other materials. This may be especially useful if an existing peripheral device is moved to another host device that does not have the necessary device driver, and the original CD-ROM that holds the device driver is lost. Therefore, step 60 is intended to include providing the peripheral device with a removable or rewritable medium that contains the network address at which information related to the peripheral device can be accessed.

At a step 61, a user connects a peripheral device to a USB port, i.e., to I/O device interface 46 (shown in FIG. 1). Alternatively, step 61 may represent power being applied to a host computer 20 with a peripheral device already connected. In yet another alternative, step 61 may not be a physical connection, but rather a logical connection, such as would occur in bringing a peripheral within infrared, radio frequency (RF) range, or other communication range of host computer 20.

Once the peripheral device is connected to the host, operating system 35 (shown in FIG. 1) detects and enumerates the new device at a step 62. As mentioned earlier, during the enumeration process, operating system 35 queries the peripheral device for a device descriptor. The device descriptor contains fields of information about the peripheral device, including a vendor ID and product ID. In addition to the device descriptor, other standard descriptors such as configuration, interface and endpoint descriptors are requested from the device.

Also as mentioned above, operating system 35 queries the peripheral device for a network address, or an index to it. The network address may be stored at a predefined index in the peripheral device, such as 0xFF. If a known predefined or reserved index is employed, the operating system can simply query that index with a standard request for a string descriptor.

Alternatively, the operating system can issue a class request at the predefined index. A class request is a command that is understood by a class of peripheral devices. For example, printers form one class of peripheral devices, while monitors form another class. Conforming printers can understand requests that are specific to the printer class, in addition to the standard requests. Similarly, monitors understand requests that are specific to the monitor class, in addition to the standard requests. However, because a URI might be obtained for any kind of peripheral device, an operating system class would preferably be formed to add a request for a network address.

Once the descriptors are known, operating system 35 determines, at a decision step 64, if the peripheral was previously installed. For example, the operating system checks whether the peripheral information is listed in the operating system's device registry, and whether the appropriate device driver is available. This check may include verifying that peripheral device's firmware reversion number is the same as that listed in the registry. If the peripheral device was previously installed on personal computer 20 (e.g., is listed in its registry), then operating system 35 simply loads the device driver and/or other software into memory 22.

If the peripheral device has not been registered on personal computer 20, or if the device driver and/or other software is no longer available on personal computer 20, then operating system 35 performs a decision step 66 to determine whether a network address is stored in the peripheral device. This determination can be accomplished in a number of ways, as described below with regard to FIGS. 3 and 4. If a network address is not stored in the peripheral device, then the device driver and/or other software must be manually loaded at a step 68, as is currently done in the prior art. Manual loading typically includes inserting a storage medium, such as a CD-ROM or floppy disk, into an appropriate drive to load the required software, or manually downloading the device driver and/or other software via the Internet, or carrying out some other procedure that requires user intervention. Manual loading may also be required if network communication is not available to personal computer 20 or is not active.

However, if a network address is stored in the peripheral device, then operating system 35 performs a step 70 to initiate download of the device driver and/or other software from a remote device accessed via the network address. Preferably, operating system 35 establishes communication with the remote device via the network address, then passes the previously obtained peripheral device information to the remote device. For example, operating system 35 can pass the product ID and firmware revision level to a remote server that uses the information to determine which device driver, application software, and/or other material is appropriate to download. Passing information about the device to the peripheral manufacturer and/or to an organization's intranet server could also be used to reduce the need to send duplicate material to the same organization, or otherwise manage the installation of multiple peripheral devices of the same type. Preferably, however, downloading material is accomplished by a file transfer request made via hypertext transfer protocol (HTTP), file transfer protocol (FTP), or other communication method.

Finally, the device driver and/or other software that was downloaded from the site referenced by the network address is installed at a step 72. Installation may be completely automatic, or may be accomplished using a "wizard" or setup program that enables a user to customize installation features or select parameters of the peripheral device or related software.

Figure 3:
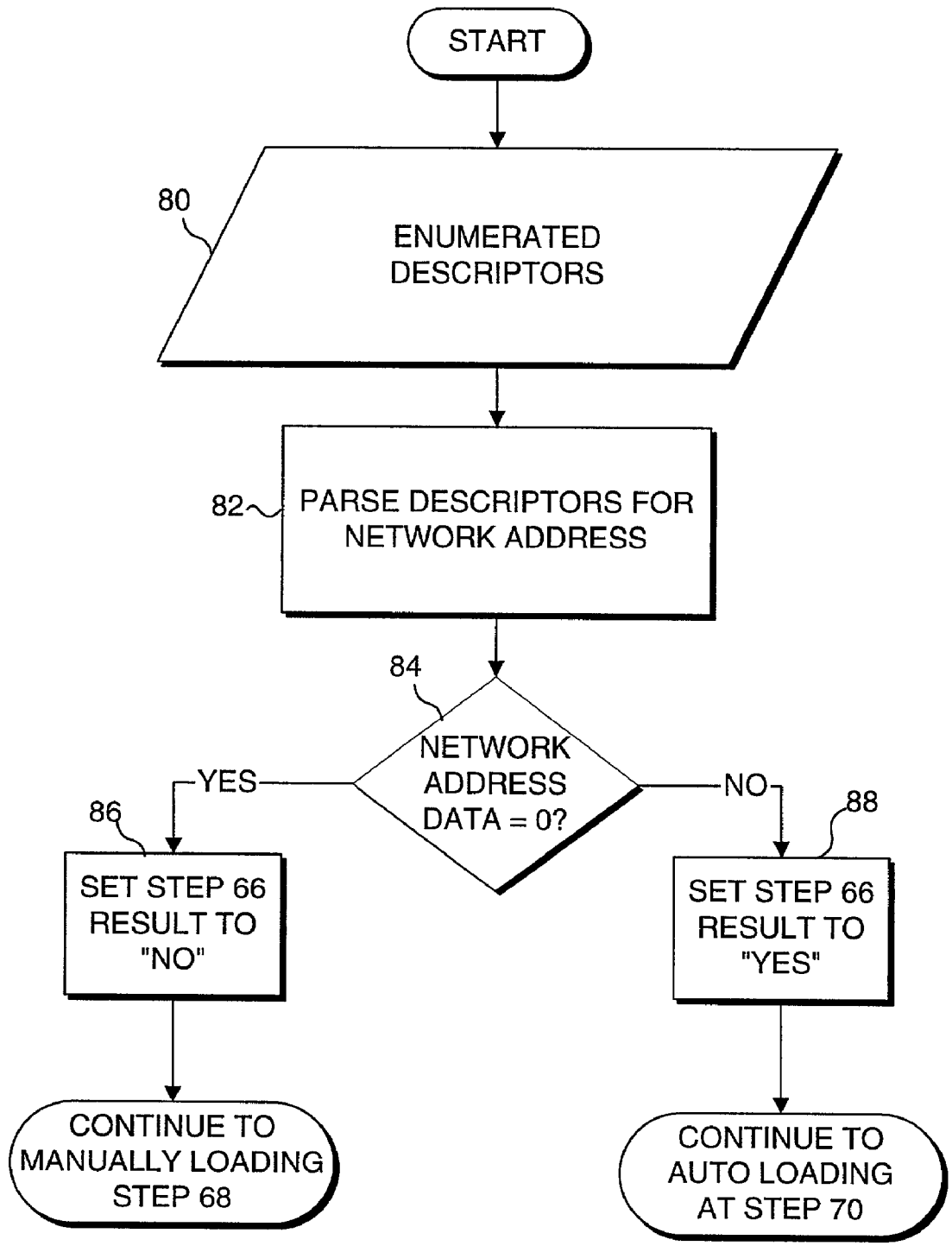
FIG. 3 is a flow diagram illustrating the logic of an embodiment for determining whether a peripheral device has a network address stored as a field of a non-standard device descriptor.

With respect to FIG. 3, a preferred embodiment representing steps implemented for determining whether a network address is stored in the peripheral device is illustrated. As described above, during enumeration in step 62 (of FIG. 2), operating system 35 (of FIG. 1) requests a number of descriptors from the peripheral device, including a Uniform Resource Identifier Information string descriptor. As noted above, the string descriptor can contain the network address, a pointer to an additional Uniform Resource Identifier Information string descriptor containing the network address, or a network address and/or additional URI information. USB strings are encoded in the international standard UNICODE®, which operating system 35 can interpret. The Uniform Resource Identifier Information string descriptor and other descriptors are held in RAM 25 (in FIG. 1) as data 80. Operating system 35 parses the descriptors into separate URI data elements, at a step 82. At a decision step 84, operating system 35 determines whether the pointer to the network address is present by checking for a value of zero, or some other predefined value indicating that the peripheral device is not provided with a network address. If no network address was identified by the parsed descriptors, the result of the overall determination (at step 66 in FIG. 2) is set to "NO" at a step 86, and the installation process continues with the conventional manual loading of drivers and/or other software via CD-ROM or floppy disk, or by manual download over the Internet or other network, at step 68 in FIG. 2. However, if a network address was thus identified, the result of the overall determination (at decision step 66 in FIG. 2) is set to "YES," or otherwise coded positive, at a step 88. With this result, the overall installation process can continue with automatic loading via the network, at step 70 in FIG. 2.

Figure 4:
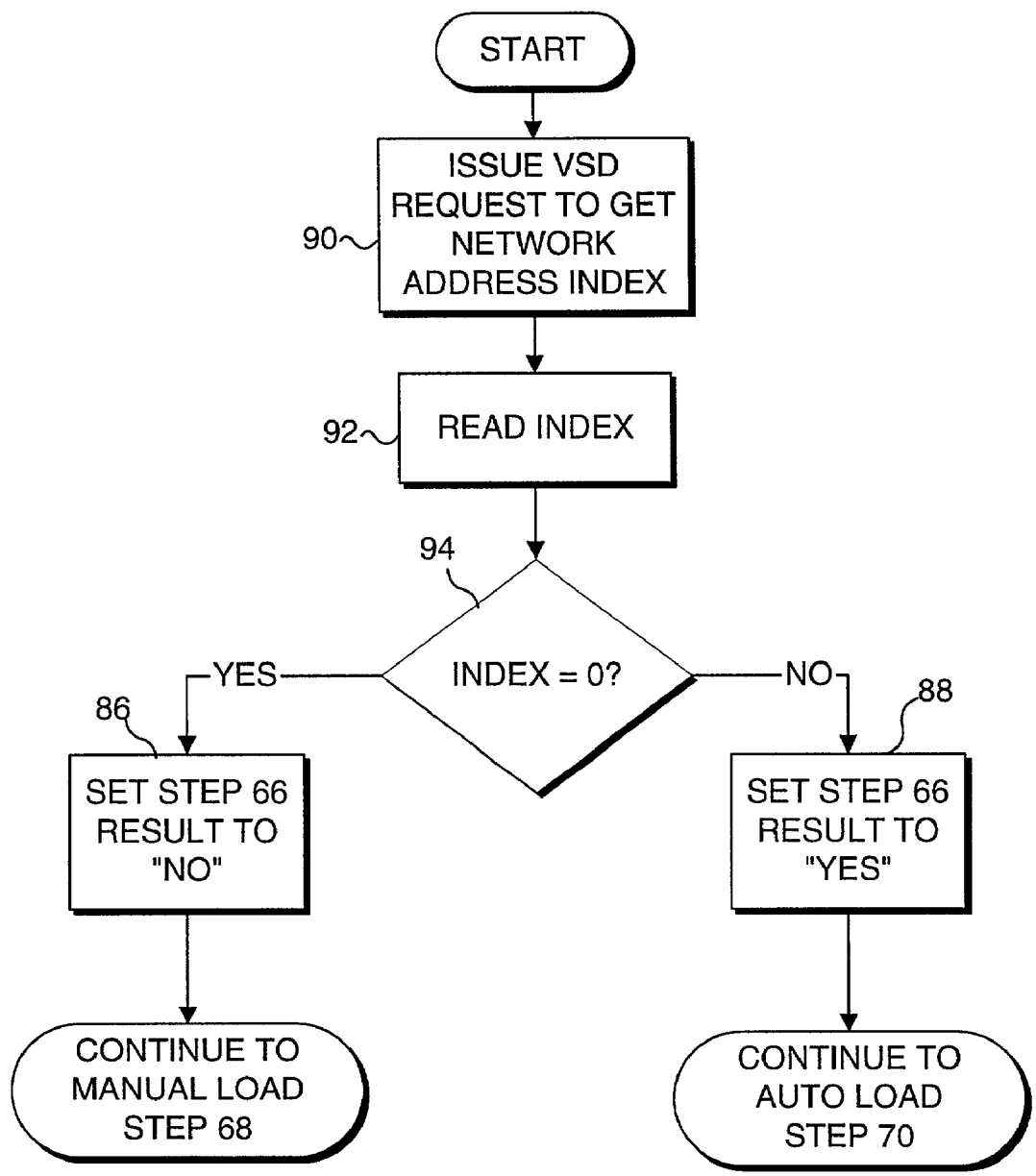
FIG. 4 is a flow diagram illustrating the logic of an embodiment for determining whether a peripheral device has a network address index stored by issuing a Vendor Specific Device (VSD) request.

To avoid requiring a predefined or reserved string descriptor index, such as 0xFF, for a URI Information string, or to avoid even using a USB standard descriptor format, FIG. 4 illustrates another embodiment to determine if and where a network address is stored in the peripheral device. During the standard enumeration process, at a step 90, operating system 35 issues a non-standard Vendor Specific Device (VSD) request to the peripheral device to return a network address or a pointer to a network address in the memory of the peripheral device. A VSD request is a command that a vendor defines and the peripheral device recognizes. The USB standard reserves a request code that enables vendors to define their own request command. Specifically, Table 9-2 of Universal Serial Bus Specification Revision 2.0, section 9.3 specifies that setting bits five (5) and six (6) of the "bmRequestType" field to a value of two (i.e., a binary value 10) identifies a request as a vendor request. Typically, the vendor is a peripheral manufacturer, and a VSD request is defined by the vendor for use during manufacturing, or post-installation, for use by the device driver during normal operation of the peripheral device. This feature provides a method for peripheral manufacturers to command their peripheral devices to perform tasks unique to the peripheral device. However, in the present embodiment, a unique VSD request is issued by operating system 35 to obtain the network address. Accordingly, any peripheral manufacturer can take advantage of the unique command provided by operating system 35. Per section 9.5 of the USB Specification mentioned earlier, the peripheral device returns a vendor specific descriptor that is independent of configuration information or uses a non-standard format.

As already noted, a further alternative would be to establish a new USB "Class," by setting bits five (5) and six (6) of the "bmRequestType" to a value of one (i.e., a binary value 01), for a network address request originating from the operating system. In either case, a VSD or Class request, for example GET_NETWORK_ADDRESS, can be provided, and during enumeration, operating system 35 can issue this request to the peripheral device. The request asks the peripheral device to provide the stored network address, or to supply a pointer to a location within the peripheral device firmware memory where the network address is stored. The peripheral device returns the network address, or pointer, to operating system 35, which reads the network address, or a location pointed to for the network address, into memory at a step 92. At a decision step 94, operating system 35 determines whether the read value is equal to zero, or equal to some other predefined value indicating that no network address is available. If so, the result of the overall determination (of step 66 in FIG. 2) is set to "NO," at a step 86. Conversely, the opposite result of the overall determination (of step 66) is set to "YES," at a step 88.

Figure 5:
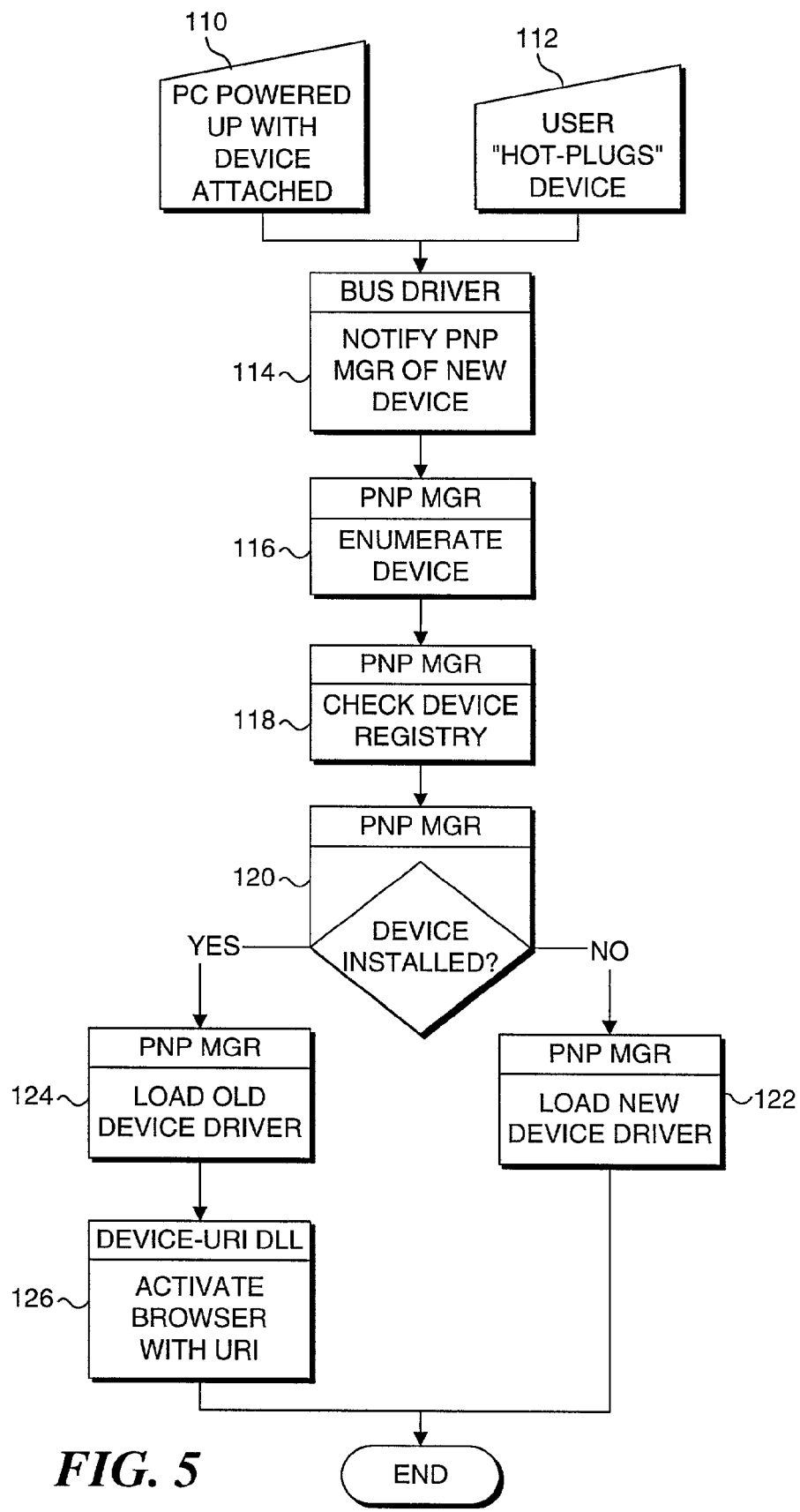
FIG. 5 is a flow diagram illustrating the logic employed to install a peripheral device and/or activate a function using a uniform resource identifier (URI)

A further detailed embodiment of the invention is illustrated in FIG. 5. In this embodiment, the present invention is incorporated into Microsoft Corporation's WINDOWS® operating system. Specifically, the portion responsible for hot connect installation of a USB peripheral device is included in the operating system. As noted above, the hot connect function and subsequent enumeration of the USB peripheral device are activated when a user connects a USB device to a host computing device, such as personal computer 20, or the host computing device is powered up with the USB peripheral device attached. Steps 110 and 112 represent these alternatives. At a step 114, a Bus Driver program detects the new USB peripheral device and notifies the Plug-and-Play Manager program that the number of devices attached to the bus has changed. At a step 116, the Plug-and-Play Manager enumerates the device by sending I/O request packets (IRP) to query the new peripheral device for a device descriptor and other device capabilities. The detailed enumeration tasks are carried out by the Bus Driver program in partnership with the Plug-and-Play Manager program. The Bus Driver program is typically a peripheral component interconnect (PCI) or Personal Computer Memory Card International Association (PCMCIA) parent bus driver. This enumeration process is similar to that described above, in that the Plug-and-Play Manager gathers information about the peripheral device, such as its vendor ID and product ID. Also as described above, at this point, the Plug-and-Play Manager will obtain the network address and any other string descriptors from the peripheral device, if present.

In this embodiment, the network address is in the form of a URI complying with the World Wide Web consortium standard for Internet resources. In addition to the URI string that identifies the network address, other supporting URI information can be obtained from the peripheral device. For example, a user-friendly name or title can be obtained for display, or further instructions can be obtained to instruct operating system 35 regarding use of the URI. If this additional information is stored as a string descriptor in the peripheral device, then it can be provided as a predefined string index. Alternatively, the additional information could be obtained via a Class driver or VSD request, as discussed above. Also as discussed above, the strings of information can be obtained directly or via a pointer to a location in the firmware memory of the peripheral device. Further encoding within the string or strings can distinguish the various types of information. For example, a forward slash symbol (/) can be used to indicate a type of information or a command to treat the following characters as a type of information. A slash T (/T) could indicate that the following characters are a title or text to display; a slash I (/I) could indicate instructions to the operating system; and a slash S (/S) could indicate the URI string. As before, the characters following one of these types of commands can either be the actual string enclosed in quotation marks or a pointer to another address in the firmware memory of the peripheral device where the string characters are stored.

Having obtained the peripheral device IDs and any other additional information from the peripheral device, the Plug-and-Play Manager examines a registry of previously installed peripheral devices at a step 118. At a decision step 120, the Plug-and-Play Manager determines whether the newly connected peripheral device has been previously installed. If not, the Plug-and-Play Manager executes an operation at a step 122 to load the new device driver. Conversely, if the peripheral device has been previously installed, the Plug-and-Play Manager loads the installed device driver at a step 124. The Plug-and-Play Manager can still use the URI by executing a Device-URI dynamic link library (DLL) at a step 126 to activate a browser or other function that will use the URI.

Figure 6:
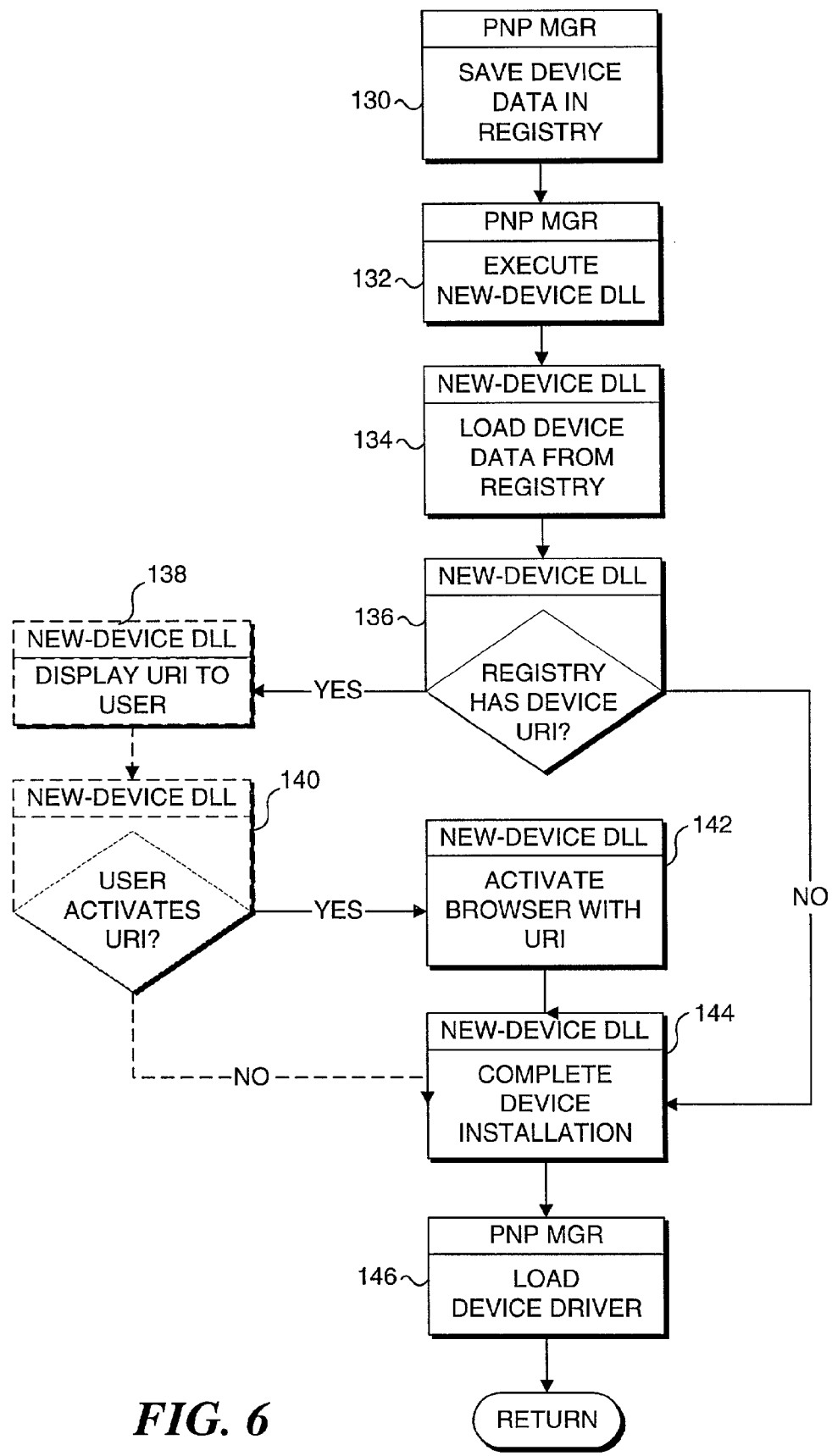
FIG. 6 is a flow diagram illustrating the logic employed to load a new device driver obtained using a URI provided by a peripheral device.

FIG. 6 illustrates details for loading a new device driver, as indicated at a step 122 in FIG. 5. The Plug-and-Play Manager first saves the device ID data, including the peripheral device URI string information, in the registry of devices, as shown at a step 130. At a step 132, the Plug-and-Play Manager executes the New-Device DLL, which obtains the device driver at the URI over the network connection, such as by downloading from the remote site identified by the URI over the Internet. At a step 134, the New-Device DLL loads the URI and other device identifiers and information from the registry of devices. To carryout this step, the New-Device DLL calls setup application program interface (API) and Configuration Manager API functions. These functions are used to build a list of possible device drivers for the newly attached peripheral device. The list is built from information (*.INF) files stored on the host machine or at the URI. At a decision step 136, the New-Device DLL verifies whether a device URI exists in the registry. If a URI is not available from the peripheral device, then the user must complete the installation manually. If the URI already exists in the registry, then, optionally, the New-Device DLL can display the URI to the user at a step 138. Further optionally, the New-Device DLL can enable the user to choose whether to activate the URI, or instead, to simply proceed with the manual installation. If the user activates the URI at a decision step 140 or if the operating system automatically activates the URI, then the New-Device DLL executes a browser function at a step 142, with the URI loaded into the address line of the browser. The browser function thus accesses the remote site with the URI provided, e.g., http://www.Microsoft.com/hardware/update/default.htm, where the New-Device DLL can obtain the device driver.

Those of ordinary skill in the art will recognize that the URI could be an active server page (ASP) or other server-side function. Also, as described above, the URI can be used in initiating a file transfer protocol (FTP) communication to obtain the device driver from the remote site. Step 142, therefore, can either transfer the device driver file to personal computer 20 or simply indicate the location of the *.INF file so that the New-Device DLL can locate the device driver, as is done when a user manually enters an update location for a device driver when requested by an operating system to do so. At a step 144, the New-Device DLL completes the peripheral device installation with the downloaded or located device driver included in the list of possible device drivers. Once the best device driver is selected and installed on personal computer 20, the Plug-and-Play Manager loads the device driver into memory at a step 146, thereby enabling the peripheral device to be used.

Figure 7:
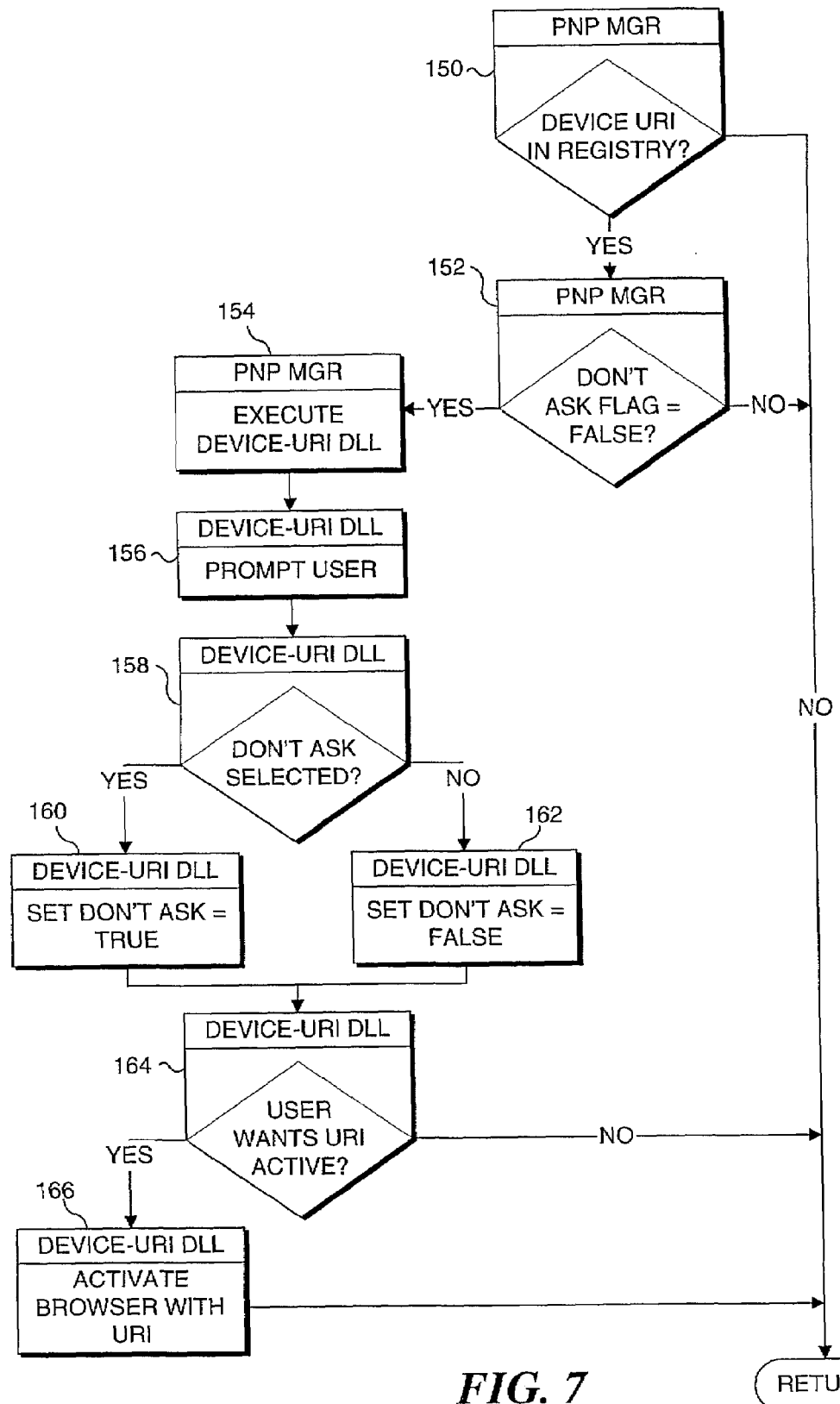
FIG. 7 is a flow diagram illustrating the logic employed to selectively activate a browser function using a URI obtained from and pertaining to a peripheral device.

With reference to FIG. 7, the URI can also be used to activate an application program at the URI, display a web page at the URI, or otherwise provide additional information or services available at the URI. To do so, the Plug-and-Play Manager verifies that the URI exists in the registry at a decision step 150. If it does not, then there is no additional information or service that can be provided. If a URI does exist, a decision step 152 determines whether a flag has been set to refrain from prompting the user to activate the URI. This feature is useful, for example, if the user prefers not to have an advertisement displayed from the URI. If a "don't ask again" option was previously selected with an entry in a check box in the browser function displaying a web page at the remote site, then the user will not be prompted to activate the browser function with the URI. An alternative would be to refrain from prompting the user to activate a browser function with the URI, and simply automatically activate the browser function with the URI. However, it may be preferable to provide the user with the option to activate the browser function with the URI.

If the "don't ask again" flag is false, meaning that the check box has not been selected previously by the user, then the Plug-and-Play Manager executes a Device-URI DLL at a step 154. At a step 156, the Device-URI DLL informs the user that the peripheral device contains a URI and prompts the user to indicate whether the user wishes to activate the URI. In this prompt the user also has the option of checking the check box to set the "don't ask again" flag. When the user submits a response to the prompt, a decision step 158 determines whether the user checked the check box. If so, then the Device-URI DLL sets the "don't ask again" flag to true at a step 160. If unchecked, the Device-URI DLL sets the "don't ask again" flag to false at a step 162. At a decision step 164, the Device-URIDLL further determines whether the user elected to activate the URI. If not, then the process is complete. However, if so, the Device-URI DLL activates the browser function in a step 166 to navigate to the network address specified by the URI. As discussed earlier, the URI may be for a site that cause the browser function to download a device driver, display an advertisement, initiate download and setup of an application program, provide help information, download a user manual for the peripheral device, or provide other services and information.

Figure 8:
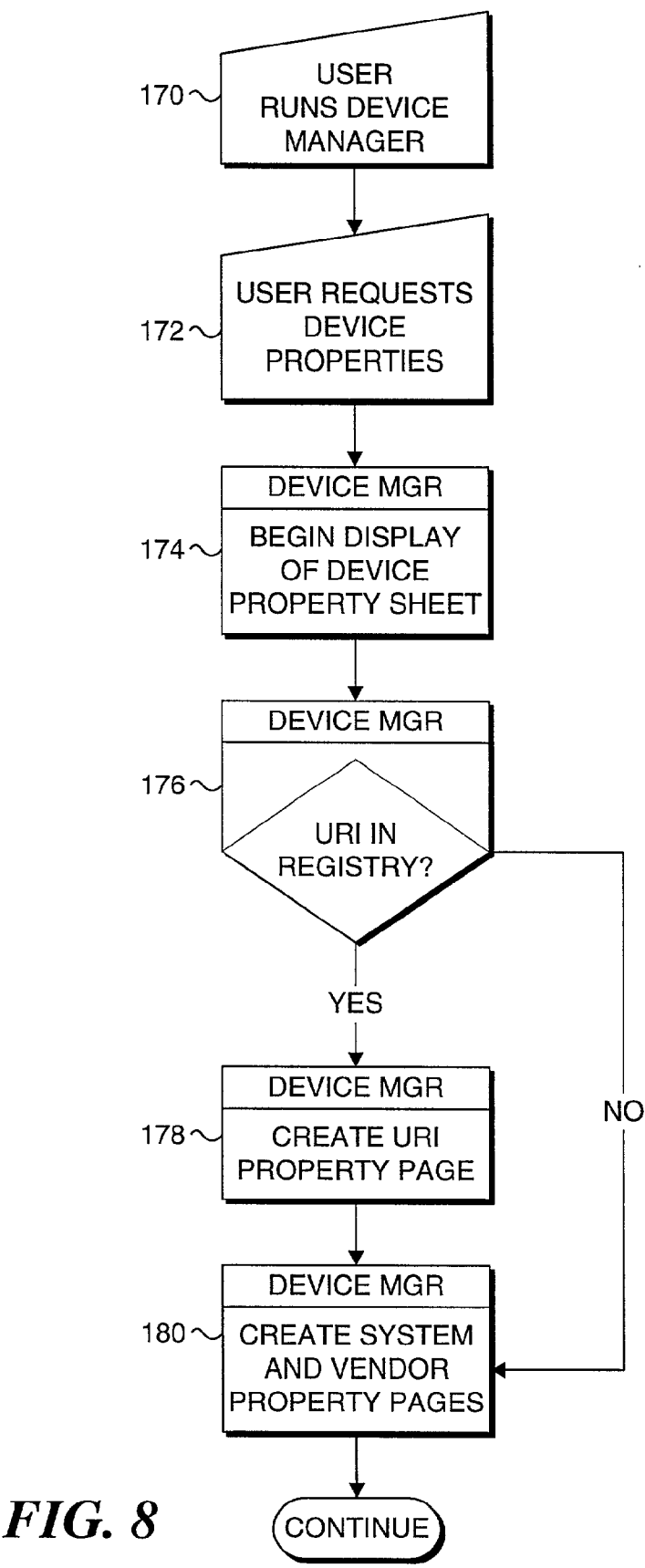
FIG. 8 is a flow diagram illustrating the logic employed to create a peripheral device URI property page for selective display and activation by a user.

FIG. 8 illustrates the steps employed for utilizing the device URI in another way. This feature enables a user to display the device URI in a form so that the user can click to activate the URI at any time. At a step 170, the user runs the Device Manager program available through the control panel of Microsoft Corporation's WINDOWS® operating system. The Device Manager displays a list of all hardware devices connected to the system, including peripheral devices that contain a URI. The user clicks on an icon representing the peripheral device at a step 172 and elects to view the properties of that peripheral device. At a step 174, the Device Manager begins to display the device property sheet that has tabs to various pages of properties pertaining to the selected peripheral device. At a decision step 176, the Device Manager looks for a device URI string in the registry of devices. If a URI string exists in the registry for the selected peripheral device, then the Device Manager invokes a URI property page that displays the device URI string, or strings, in a format that enables the user to click on the URI string to activate communication to the network address specified by the URI. Preferably, a step 178 performs this operation by executing a browser function and navigating to the location or web page specified by the URI. Once the URI has been activated (or if a URI string is not in the registry), then the Device Manager performs a step 180 to create standard peripheral device property pages.

Figure 9:
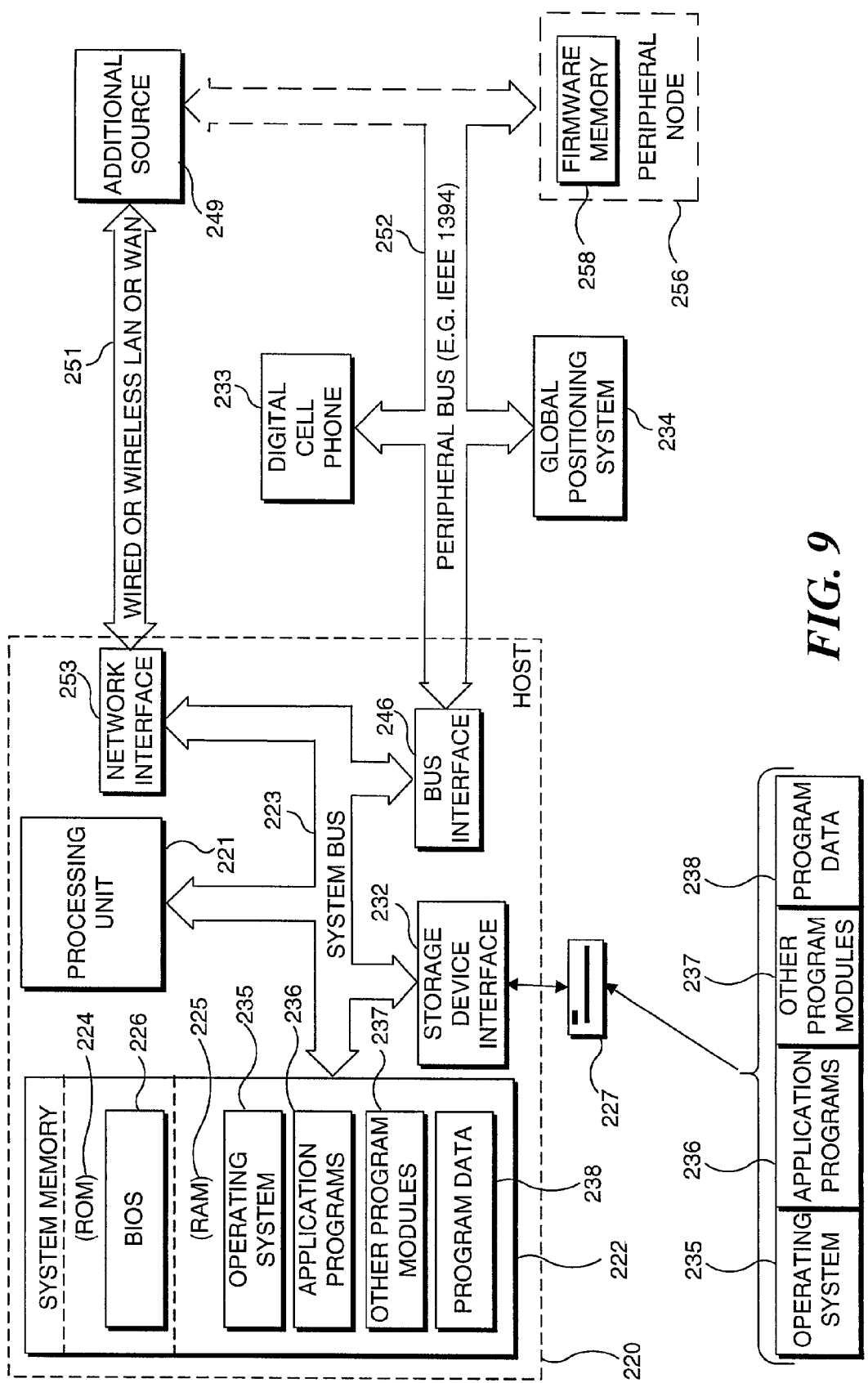
FIG. 9 is a schematic block diagram of an exemplary personal vehicle assistant (PVA) system suitable for implementing the present invention.

With reference to FIG. 9, an alternative application of the present invention is in connection with a special purpose computing device. This computing device is a personal vehicle assistant (PVA) 220. A PVA is similar in some respects to a personal data assistant (PDA); however, a PVA is optimized for use in a vehicle, such as an automobile. Microprocessors play an increasingly important role in the operation of modem vehicles and are used to control the operation of the vehicle, its lighting systems, entertainment systems, and more recently, in providing emergency assistance and navigation functions. Drivers have become dependent upon such sophisticated features in their vehicles to make driving time safer, more productive, and enjoyable. The designs for vehicles currently being marketed and for those under development incorporate electronic features such as display screens, speakers and a remote microphone coupled to a cellular telephone, drives for digital navigation maps, and Web access. In a vehicle, there is a substantial expense in connecting each peripheral device to a PVA because of the need for routing individual wires for each peripheral device. To overcome this problem, a peripheral bus can be used that enables many peripheral devices to communicate with the PVA (and with each other) over a single set of wires.

Those skilled in the art will recognize that the exemplary embodiment shown in FIG. 9 is but a single illustration of how the present invention is applicable to many other types of computing devices and peripheral devices other than a personal computer and the peripheral devices customarily associated therewith. The present invention is clearly also applicable to special purpose computing devices in other fields, such as industrial programmable logic controllers, building management computers, flight control computers, and other intelligent devices that interact with almost any type of peripheral device.

PVA 220 is provided with a processing unit 221, a system memory 222, a system bus 223, a storage device interface 232, a bus interface 246, and a network interface 253. Other components, such as a video adapter, printer interface, or the like, may optionally be included in PVA 220, but are not shown in order to simplify the illustration. The system bus couples various system components including the system memory to processing unit 221 and may comprise one or more of several conventional types of bus structures and architectures, including a memory bus, or memory controller, a peripheral bus, and a local bus.

The system memory includes ROM 224 and RAM 225. A BIOS 226, containing the basic routines used to transfer information between components within PVA 220, is stored in ROM 224. PVA 220 further interfaces with a storage device 227 for reading from and/or writing to a permanent or removable media. Storage device 227 is connected to system bus 223 by storage device interface 232. The storage device and its associated machine-readable media store machine instructions, data structures, program modules, and other data for PVA 220. It will be appreciated by those skilled in the art that numerous types of machine-readable media can be used to store data that is accessible by a processor, such as floppy disks, magnetic cassettes, flash memory cards, digital video disks, Bernoulli cartridges, RAMs, ROMs, and the like. A number of program modules may be stored on the machine-readable media, including an operating system 235 (with a browser function), one or more application programs 236 (such as a setup program), other program modules 237, and program data 238.

PVA 220 communicates with peripheral devices via bus interface 246 and peripheral bus 252. Peripheral bus 252 may be an IEEE 1394 bus, an ISO 11898 bus (e.g., a Bosch Corporation Controller Area Network), or other type of bus. Those skilled in the art will recognize that numerous other peripheral buses exist in other fields in which the present invention can be employed, such as in the industrial manufacturing field, which may use an EN 50170 bus (e.g., a Profibus), an ISA SP50 bus (e.g., a Fieldbus Foundation bus) for smart peripherals; or in the aerospace field, which uses an ARINC™ bus for line-replaceable units. In some applications, it may also be possible to simply extend system bus 223.

Note that in a conventional prior art operating system, it is common to designate a specific directory to search for a device driver usable with a newly attached peripheral device. In contrast, the present invention requires that the operating system obtain a location where the device driver is located from the peripheral device. In other words, the peripheral device supplies the location or address where information related to the peripheral device, such as a device driver for it, can be found. In the embodiment of FIG. 9 illustrating a use for the present invention, this same novel functionality is implemented.

Connected to peripheral bus 252 in FIG. 9 are a digital cell phone 233 and a global positioning system 234. Other peripheral devices connected to peripheral bus 252 may include typical peripheral devices that are currently incorporated into automobiles, such as compact disk players, digital video disk players, etc. Additional source 249 could provide direct access to device drivers or other material when they are connected to peripheral bus 252. The new connection of a peripheral device can occur during initial production, during maintenance at a service station, or at other times after a vehicle has been placed into service.

As generally indicated above, each peripheral device connected to peripheral bus 252 is a peripheral node 256, and includes firmware memory 258 for holding information. Firmware memory 258 may be EPROM, flash memory, magnetic storage, or other types of memory. Firmware memory 258 stores a vendor ID, a product ID, and/or other information related to peripheral node 256. In addition, the firmware memory also stores a URI or other type of address indicating a location from which a driver for the peripheral node and/or other material relevant to the peripheral node can be accessed and/or downloaded.

As before, the URI or address stored in the firmware memory of the peripheral node can specify a location where additional source 249 can be accessed. Additional source 249 may be another PVA, an external server (which might be generally equivalent to personal computer 20), a router, a network personal computer, a peer peripheral device, a satellite, or another common network node.

Like personal computer 20, PVA 220 operates in a networked environment using logical connections to one or more devices via a network interface 253 and a network 251. Network 251 may be a wireless network for mobile communication, or a wired network for communication at the manufacturing site, service stations, fleet stations, or residence. Whether wireless, or wired, network 251 may be a wide area network (WAN), a local area network (LAN) or other type of communication network. Such networking environments are commonly used for digital cellular telephones, global positioning systems, emergency roadside assistance systems, shipping fleet communications, and the Internet. Network 251 enables the PVA 220 to communicate with remote sources, such as additional source 249. It will be appreciated that the network connections shown are exemplary and other means of establishing a communication link may be used, such as a conventional modem.

Accessing information related to peripheral node 256 from additional source 249 is accomplished in much the same manner as described above for the USB embodiment. However, enumeration and other communication with peripheral node 256 is done through intervening peripheral bus 252, which simply adds a shared layer of communication between processing unit 221 and peripheral node 256.

When a new peripheral node is connected to peripheral bus 252, operating system 235 enumerates the new node generally as described above in connection with the USB embodiment. However, when a new peripheral node is connected to peripheral bus 252, bus interface 246 must first establish a peripheral bus address for the new peripheral node. In the USB embodiment, an address is known for the USB port to which the new device is connected. By contrast, only the peripheral bus is connected to a port on the PVA. Thus, an intervening bus address for each peripheral node must be established before the new node can be enumerated. As mentioned, this step is accomplished in accord with the well-known standards applicable to the particular peripheral bus employed.

For example, when a new node is connected to an IEEE 1394 peripheral bus, the bus resets itself completely, and all of the peripheral nodes communicate among themselves to determine a new bus address for each peripheral node connected to the bus. The bus addresses are digits from zero to n-1, where n is the number of peripheral nodes. Then, PVA 220 enumerates each peripheral node on the peripheral bus, including peripheral node 256. Each peripheral node contains a bus information block similar to a device descriptor in USB. The third and fourth quadlets of the bus information block include a globally unique device ID.

A textual descriptor outside the bus information block, can also point to a leaf, at another location in firmware memory 258 that stores the URI as a string. This textual descriptor can be obtained during or after enumeration. Once the network has been obtained from peripheral node 256, the remaining steps of the method for accessing the network address and information pertaining to the peripheral node are generally similar to the step implemented in the USB embodiment described above.

Although the present invention has been described in connection with the preferred form of practicing it and modifications thereto, those of ordinary skill in the art will understand that many other modifications can be made to the present invention within the scope of the claims that follow. Accordingly, it is not intended that the scope of the invention in any way be limited by the above description, but instead be determined entirely by reference to the claims that follow.

The invention claimed is:

1. A method of accessing information related to a peripheral device, comprising the steps of:
    (a) providing a network address in a storage of the peripheral device;
    (b) when the peripheral device is coupled to a host device, transferring the network address from the peripheral device to the host device, said step of transferring comprising the steps of:
        (i) providing a pointer to a location in an addressable memory of the peripheral device at which the network address is stored;
        (ii) communicating the pointer to the host device;
        (iii) using the pointer to access the location in the addressable memory of the peripheral device; and
        (iv) communicating the network address to the host device from said location; and
    (c) enabling communication between the host device and a source indicated by the network address, said communication pertaining to the peripheral device, said step of enabling communication comprising the steps of:
        (i) requesting permission of a user to communicate with the source; and
        (ii) upon receiving permission to do so from the user, initiating the communication between the host device and the source to automatically obtain information from the source pertaining to the peripheral device.

2. The method of claim 1, wherein the step of providing comprises the step of storing the network address in the addressable memory of the peripheral device.

3. The method of claim 1, wherein the step of providing comprises the step of storing the network address in one of a removable storage medium and a rewritable storage medium that are readable by the peripheral device.

4. The method of claim 1, further comprising the step of detecting a change in the number of peripheral devices connected to the host device to determine when the peripheral device is connected to the host device.

5. The method of claim 1, wherein the peripheral device is coupled to the host device through one of:
    (a) a wired connection to an input/output port interface on the host device; and
    (b) a wireless connection between the host device and the peripheral device.

6. The method of claim 1, wherein the step of transferring comprises the steps of:
    (a) issuing a request to the peripheral device for a string descriptor;
    (b) receiving the string descriptor; and
    (c) from the string descriptor, determining one of:
        (i) the network address; and
        (ii) a pointer to a location at which the network address is stored.

7. The method of claim 1, wherein the step of transferring comprises the steps of:
    (a) issuing a Class request to the peripheral device to obtain the stored network address;
    (b) receiving a response to the Class request; and
    (c) from the response, determining one of:
        (i) the network address; and
        (ii) a pointer to a location at which the network address is stored.

8. The method of claim 1, wherein the step of transferring comprises the steps of:
    (a) issuing a Vendor Specific Device request to the peripheral device to obtain the network address;
    (b) receiving a response to the Vendor Specific Device request; and
    (c) from the response, determining one of:
        (i) the network address; and
        (ii) a pointer to a location at which the network address is stored.

9. The method of claim 1, wherein the step of enabling communication comprises the step of automatically retrieving at least one of data, machine instructions, and a document pertaining to the peripheral device from the source indicated by the network address.

10. The method of claim 1, wherein the step of enabling communication comprises the step of automatically executing a setup program obtained from the source and pertaining to the peripheral device.

11. The method of claim 1, wherein the step of enabling communication comprises the step of automatically displaying a web page available at the source indicated by the network address.

12. The method of claim 1, wherein the step of enabling communication comprises the step of automatically installing a device driver program pertaining to the peripheral device, on the host device.

13. The method of claim 1, wherein the step of enabling communication comprises the step of automatically downloading and installing updated firmware into the peripheral device.

14. The method of claim 1, wherein the step of enabling communication comprises the step of automatically executing an application program pertaining to the peripheral device.

15. The method of claim 1, further comprising the step of providing a properties page for the peripheral device that includes a link to the network address, thereby enabling a user to select the link to activate a browser function to subsequently access the source.

16. The method of claim 1, wherein the step of enabling communication further comprises the step of automatically executing a browser function on the host device and automatically navigating to the network address.

17. The method of claim 1, further comprising the step of requesting whether a user wants to execute a browser function on the host device and automatically navigating to the network address only if authorized by the user.

18. The method of claim 17, further comprising the step of automatically executing a browser function on the host device and automatically navigating to the network address if authorized by the user.

19. The method of claim 17, further comprising the step of enabling a user to selectively suppress further requests to execute a browser function on the host device and thereby to prevent the step of automatically navigating to the network address from occurring.

20. A machine-readable medium having machine-executable instructions for performing steps (b) and (c) of claim 1.

21. A system for automatically accessing information related to a peripheral device, comprising:
(a) a peripheral device in which a network address is stored;
(b) a host device comprising:
(i) a memory in which machine instructions are stored;
(ii) a network interface used to communicate over a network;
(iii) a processor; and
(iv) a peripheral interface adapted to communicate with a peripheral device that is operatively connected to the peripheral interface; and
(c) a source of machine-readable material pertaining to the peripheral device, said source being accessible by the host device at the network address stored in the peripheral device, through the network interface, said machine instructions stored in the memory causing the processor to:
(i) transfer the network address from the peripheral device to the host device when the peripheral device is coupled to a host device; and
(ii) enable communication between the host device and the source at the network address, if a user has granted permission, to enable the host device to automatically access the machine-readable material.

22. The system of claim 21, wherein said machine instructions further cause the processor to:
(a) issue a request to the peripheral device for a string descriptor;
(b) receive the string descriptor; and
(c) from the string descriptor, determine one of:
(i) the network address; and
(ii) a pointer to a location at which the network address is stored.

23. The system of claim 21, wherein said machine instructions further cause the processor to:
(a) issue a Class request to the peripheral device to obtain the stored network address;
(b) receive a response to the Class request; and
(c) from the response, determine one of:
(i) the network address; and
(ii) a pointer to a location at which the network address is stored.

24. The system of claim 21, wherein said machine instructions further cause the processor to:
(a) issue a Vendor Specific Device request to the peripheral device to obtain the network address;
(b) receive a response to the Vendor Specific Device request; and
(c) from the response, determine one of:
(i) the network address; and
(ii) a pointer to a location at which the network address is stored.

25. The system of claim 21, wherein said machine instructions further cause the processor to automatically retrieve at least one of data, machine instructions, and a document pertaining to the peripheral device from the source indicated by the network address.

26. The system of claim 21, wherein said machine instructions further cause the processor to automatically execute a setup program obtained from the source and pertaining to the peripheral device.

27. The system of claim 21, wherein said machine instructions further cause the processor to automatically display a web page available at the source indicated by the network address.

28. The system of claim 21, wherein said machine instructions further cause the processor to automatically install a device driver program pertaining to the peripheral device on the host device.

29. The method of claim 21, wherein said machine instructions further cause the processor to automatically download and install updated firmware into the peripheral device.

30. The system of claim 21, wherein said machine instructions further cause the processor to automatically execute an application program pertaining to the peripheral device.

31. The system of claim 21, wherein said machine instructions further cause the processor to provide a properties page for the peripheral device that includes a link to the network address, thereby enabling a user to select the link to activate a browser function to access the source.

32. The system of claim 21, wherein said machine instructions further cause the processor to automatically execute a browser function on the host device and automatically access the source at the network address.

33. The system of claim 21, wherein said machine instructions further cause the processor to request whether a user wants to execute a browser function on the host device and automatically access the source at the network address, only if authorized by the user.

34. The system of claim 33, wherein said machine instructions further cause the processor to automatically execute a browser function on the host device and automatically access the source at the network address, if previously authorized by the user.

35. The system of claim 33, wherein said machine instructions further cause the processor to enable a user to selectively suppress further requests to execute a browser function on the host device, and thereby to prevent automatically accessing the source at the network address.

* * * * *